June 20, 1944.　　　M. GRIVETTO　　　2,351,957
SADDLE SUPPORT FOR CYCLES
Filed March 18, 1942
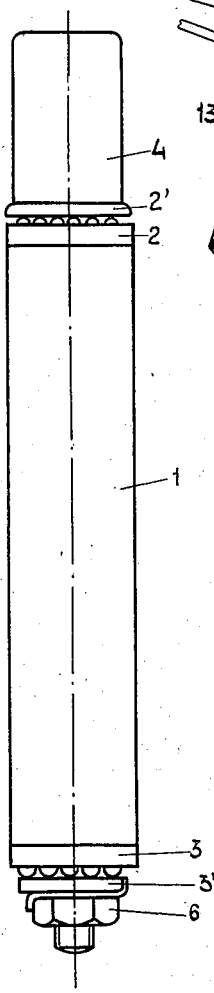
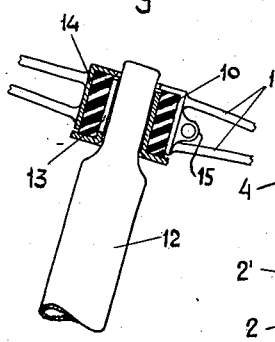
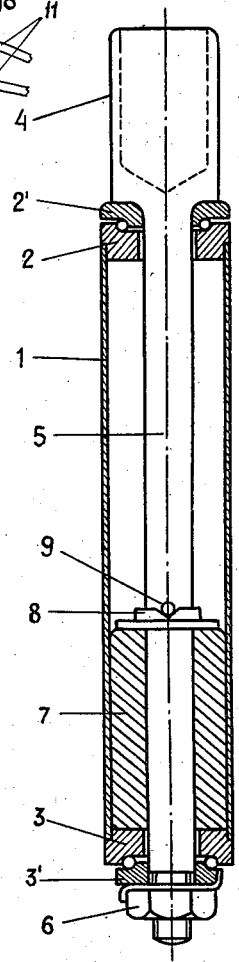
Inventor:
Michele Grivetto
By
Young, Emery & Thompson
Attys.

Patented June 20, 1944

2,351,957

UNITED STATES PATENT OFFICE 2,351,957

SADDLE SUPPORT FOR CYCLES

Michele Grivetto, Turin, Italy; vested in the Alien Property Custodian

Application March 18, 1942, Serial No. 435,159½
In Italy May 31, 1941

1 Claim. (Cl. 155—5.24)

This invention relates to a device for supporting cycle saddles, which allows small displacements of the saddle in a substantially horizontal plane, so that the saddle may follow and suit the movements performed by the cyclist in riding.

According to this invention, the angular displacements of the saddle take place against the action of resilient means which act at the same time as shock absorbers and tend to return the saddle to its normal position in alignment with the frame, suitable means being provided for limiting the width of the angular displacement of the saddle.

According to a preferred embodiment of this invention, the saddle pillar, which is fitted into the saddle socket, encloses a rod carrying the saddle on its top which rod can oscillate about its axis with respect to the saddle pillar through the angular width required for the abovementioned purpose.

The accompanying drawing shows by way of example a construction embodying object of this invention.

Figure 1 is an elevation of the saddle support,
Figure 2 is a longitudinal section and
Figure 3 shows a modification of the invention.

1 denotes the saddle pillar closed at its ends by the top and bottom discs 2 and 3, respectively, which in the construction shown form at the same time the inner race of a thrust and radial ball bearing, the outer race of which is denoted by numerals 2' and 3', respectively. 4 denotes a head carrying the saddle fixed thereto, from which extends a rod 5 of smaller diameter extending radially of the pillar 1 and having a screw-threaded end for receiving the nut 6 by means of which the head 4 and rod 5 are fixed to the pillar 1, with respect to which the rod 5 and tubular head 4 may therefore freely rotate on bearings.

In the construction shown, the resilient means is a rubber cylinder 7 forced on the rod 5, of which the ends are clamped between the disc 8, and the disc 3 and the cylinder 7 engages the inner wall of the housing or pillar 1 snugly embraced therein and is prevented from sliding along the rod 5 by means of pins 9 extending therethrough and against the disc 8. By tightening the nut 6, the rubber cylinder 7 is compressed in an axial direction, whereby the rubber cylinder expands and its peripheral cylindrical surface is compressed against the inner walls of the pillar 1. The small angular displacements performed by the rod 5 with respect to the pillar 1 produce a resilient deformation of the rubber cylinder 7, on an angular displacement of the rod in either direction, and the cylinder resiliently reacts against said displacement and damps any movement. As mentioned above, resilient means of any kind may be used other than the rubber cylinder 7, such as volute or helical springs or the like.

In the modification shown in Figure 3, the device permitting small angular resilient displacements of the saddle, consists of a resilient abutment member 10 applied to the armature 11 of the saddle and fitted on the saddle pillar of normal construction. In order to lock the saddle on the pillar, the inner sleeve 13 of the resilient abutment member is expansible and the outer sleeve 14 is cut and provided with lugs 15 for clamping the resilient abutment member on the pillar 12.

What I claim is:

Cycle saddle support, comprising a saddle pillar adapted to be fixed in the saddle socket, a rod enclosed in said saddle pillar and rotatably mounted on bearings at the end of said saddle pillar, a head on the said rod and adapted to carry the saddle, a rubber sleeve fitted on said rod and means for forcing said rubber sleeve between the rod and inner wall of said saddle pillar.

MICHELE GRIVETTO.